(12) United States Patent
Lovicott et al.

(10) Patent No.: US 10,146,190 B2
(45) Date of Patent: Dec. 4, 2018

(54) SYSTEMS AND METHODS FOR PROVIDING CONTROLLER RESPONSE STABILITY IN A CLOSED-LOOP SYSTEM

(71) Applicant: Dell Products L.P., Round Rock, TX (US)

(72) Inventors: Dominick A. Lovicott, Round Rock, TX (US); Carlos G. Henry, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 15/141,475

(22) Filed: Apr. 28, 2016

(65) Prior Publication Data

US 2017/0315568 A1    Nov. 2, 2017

(51) Int. Cl.
| | | |
|---|---|---|
| *G05B 11/42* | (2006.01) | |
| *G05D 23/19* | (2006.01) | |
| *G06F 1/20* | (2006.01) | |

(52) U.S. Cl.
CPC ......... *G05B 11/42* (2013.01); *G05D 23/1919* (2013.01); *G06F 1/206* (2013.01)

(58) Field of Classification Search
None
See application file for complete search history.

(56) References Cited

U.S. PATENT DOCUMENTS

| | | | | |
|---|---|---|---|---|
| 5,714,831 A * | 2/1998 | Walker | .................. | H02N 2/062 310/316.01 |
| 6,693,763 B2 * | 2/2004 | Bi | ........................ | G11B 5/5552 360/75 |
| 6,717,330 B2 * | 4/2004 | Iino | ......................... | H02N 2/14 310/317 |
| 6,870,345 B1 * | 3/2005 | Wand | ..................... | G05B 11/42 318/560 |
| 7,782,003 B2 * | 8/2010 | Melrose | .............. | G05B 19/251 318/560 |
| 7,809,668 B1 * | 10/2010 | Smith | ................ | G05B 13/0275 700/42 |
| 7,975,314 B2 * | 7/2011 | Ando | ................... | G01Q 10/065 310/316.01 |
| 9,058,026 B2 * | 6/2015 | Griffith | .................. | G05B 17/02 |

(Continued)

*Primary Examiner* — Jason Lin
(74) *Attorney, Agent, or Firm* — Jackson Walker L.L.P.

(57) ABSTRACT

A method may include: (i) based on an error between a setpoint value and a measured process value, determining an integrated error indicative of a time-based integral of the error; (ii) based on the error, determining a differential error indicative of a time-based derivative of the error; (iii) based on the integrated error and the error, generating a proportional-integral output driving signal; (iv) based on the differential error and the error, generating a proportional-differential output driving signal; (v) determining whether the differential error is stable; (vi) responsive to determining that the differential error is stable, generating a driving signal for controlling a plant based on the proportional-differential output driving signal and independent of the proportional-integral output driving signal; (vii) responsive to determining that the differential error is unstable, generating the driving signal for controlling the plant based on the proportional-differential output driving signal and the proportional-integral output driving signal.

18 Claims, 3 Drawing Sheets

214

| | | MAXIMUM DIFFERENTIAL ERROR SIGNAL (°C/POLLING CYCLE) 302 | | | | | | | | | |
|---|---|---|---|---|---|---|---|---|---|---|---|
| 306 | POLLING RATE (SECONDS) | 1 | 2 | 3 | 4 | 5 | 6 | 7 | 8 | 9 | 10 |
| | 1 | 1.00 | 2.00 | 3.00 | 4.00 | 5.00 | 6.00 | 7.00 | 8.00 | 9.00 | 10.00 |
| | 5 | 0.20 | 0.40 | 0.60 | 0.80 | 1.00 | 1.20 | 1.40 | 1.60 | 1.80 | 2.00 |
| | 10 | 0.10 | 0.20 | 0.30 | 0.40 | 0.50 | 0.60 | 0.70 | 0.80 | 0.90 | 1.00 |
| | 60 | 0.02 | 0.03 | 0.05 | 0.07 | 0.08 | 0.10 | 0.12 | 0.13 | 0.15 | 0.17 |
| | 300 | 0.00 | 0.01 | 0.01 | 0.01 | 0.02 | 0.02 | 0.02 | 0.03 | 0.03 | 0.03 |

304

(56) References Cited

U.S. PATENT DOCUMENTS

| | | | | |
|---|---|---|---|---|
| 9,097,769 B2* | 8/2015 | Schillak | | G01R 33/3607 |
| 9,500,727 B2* | 11/2016 | Sohn | | G01R 33/34092 |
| 9,847,471 B2* | 12/2017 | Snyder | | H01L 41/042 |
| 2009/0005886 A1* | 1/2009 | Gao | | G05B 5/01 |
| | | | | 700/29 |
| 2014/0331780 A1* | 11/2014 | Squires | | G01N 3/32 |
| | | | | 73/805 |

* cited by examiner

| MAXIMUM DIFFERENTIAL ERROR SIGNAL (°C/POLLING CYCLE) | | | | | | | | | | |
|---|---|---|---|---|---|---|---|---|---|---|
| POLLING RATE (SECONDS) | 1 | 2 | 3 | 4 | 5 | 6 | 7 | 8 | 9 | 10 |
| 1 | 1.00 | 2.00 | 3.00 | 4.00 | 5.00 | 6.00 | 7.00 | 8.00 | 9.00 | 10.00 |
| 5 | 0.20 | 0.40 | 0.60 | 0.80 | 1.00 | 1.20 | 1.40 | 1.60 | 1.80 | 2.00 |
| 10 | 0.10 | 0.20 | 0.30 | 0.40 | 0.50 | 0.60 | 0.70 | 0.80 | 0.90 | 1.00 |
| 60 | 0.02 | 0.03 | 0.05 | 0.07 | 0.08 | 0.10 | 0.12 | 0.13 | 0.15 | 0.17 |
| 300 | 0.00 | 0.01 | 0.01 | 0.01 | 0.02 | 0.02 | 0.02 | 0.03 | 0.03 | 0.03 | ize
SYSTEMS AND METHODS FOR PROVIDING CONTROLLER RESPONSE STABILITY IN A CLOSED-LOOP SYSTEM

TECHNICAL FIELD

The present disclosure relates in general to information handling systems, and more particularly to providing controller response stability in a closed-loop system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Temperature control in an information handling system with air movers often involves use of a closed-loop feedback system that alters air mover speed or throttles component performance in response to a sensed temperature in the information handling system. A controller of the closed-loop feedback system is typically tuned to account for known system interactions. However, even well-tuned controllers may suffer from undesirable oscillation (e.g., temperature overshoot or undershoot, air mover speed overshoot or undershoot) which may cause psychoacoustical annoyance to a user of the information handling system, performance throttling, reduced component reliability, and reduced component stability, and/or other problems.

SUMMARY

In accordance with the teachings of the present disclosure, the disadvantages and problems associated with controller response stability in a closed-loop system may be substantially reduced or eliminated.

In accordance with embodiments of the present disclosure, a system may include an integrator, a differentiator, a proportional-integral controller, a proportional-differential controller, a comparator, and control logic. The integrator may be configured to, based on an error between a setpoint value and a measured process value, determine an integrated error indicative of a time-based integral of the error. The differentiator may be configured to, based on the error, determine a differential error indicative of a time-based derivative of the error. The proportional-integral controller may be configured to, based on the integrated error and the error, generate a proportional-integral output driving signal. The proportional-differential controller may be configured to, based on the differential error and the error, generate a proportional-differential output driving signal. The comparator may be configured to determine whether the differential error is stable. The control logic may configured to, responsive to determining that the differential error is stable, generate a driving signal for controlling a plant based on the proportional-differential output driving signal and independent of the proportional-integral output driving signal and responsive to determining that the differential error is unstable, generate the driving signal for controlling the plant based on the proportional-differential output driving signal and the proportional-integral output driving signal.

In accordance with these and other embodiments of the present disclosure, a method may include, based on an error between a setpoint value and a measured process value, determining an integrated error indicative of a time-based integral of the error. The method may also include, based on the error, determining a differential error indicative of a time-based derivative of the error. The method may also include, based on the integrated error and the error, generating a proportional-integral output driving signal. The method may further include, based on the differential error and the error, generating a proportional-differential output driving signal. The method may additionally include determining whether the differential error is stable. The method may also include, responsive to determining that the differential error is stable, generating a driving signal for controlling a plant based on the proportional-differential output driving signal and independent of the proportional-integral output driving signal. The method may also include responsive to determining that the differential error is unstable, generating the driving signal for controlling the plant based on the proportional-differential output driving signal and the proportional-integral output driving signal.

In accordance with these and other embodiments of the present disclosure, a system may include an integrator, a differentiator, a proportional-integral controller, a proportional-differential controller, a comparator, and control logic. The integrator may be configured to, based on an error between a setpoint value and a measured process value, determine an integrated error indicative of a time-based integral of the error. The differentiator may be configured to, based on the error, determine a differential error indicative of a time-based derivative of the error. The proportional-integral controller may be configured to, based on the integrated error and the error, generate a proportional-integral output driving signal. The proportional-differential controller may be configured to, based on the differential error and the error, generate a proportional-differential output driving signal. The comparator may be configured to determine whether the differential error is stable. The control logic may be configured to determine a maximum differential error of a plurality of polling cycles of the measured process value, determine a polling rate associated with the measured process value, determine a proportional-integral controller gain based on the maximum differential error and the polling rate, and generate a driving signal for controlling a plant based on the proportional-integral output driving signal as modified by the proportional-integral controller gain and based on the proportional-differential output driving signal.

In accordance with these and other embodiments of the present disclosure, a method may include, based on an error between a setpoint value and a measured process value, determining an integrated error indicative of a time-based integral of the error. The method may also include, based on the error, determining a differential error indicative of a time-based derivative of the error. The method may additionally include, based on the integrated error and the error, generating a proportional-integral output driving signal. The method may further include, based on the differential error and the error, generating a proportional-differential output driving signal. The method may also include determining a maximum differential error of a plurality of polling cycles of the measured process value. The method may additionally include determining a polling rate associated with the measured process value. The method may additionally include determining a proportional-integral controller gain based on the maximum differential error and the polling rate. The method may also include generating a driving signal for controlling a plant based on the proportional-integral output driving signal as modified by the proportional-integral controller gain and based on the proportional-differential output driving signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages, electro-mechanical devices (e.g., air movers), displays, and power supplies.

Figures 1, 3:
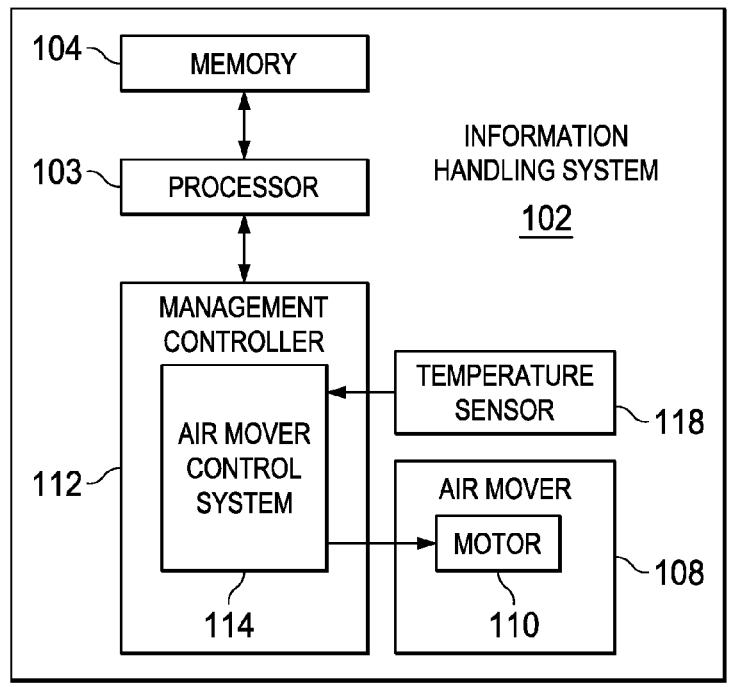
FIG. 1 illustrates a block diagram of an example information handling system, in accordance with embodiments of the present disclosure.
FIG. 3 illustrates an example lookup table for generating a proportional-integral controller gain based on a polling rate and temperature rate of change, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, an air mover 108, a management controller 112, and a temperature sensor 118.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Air mover 108 may include any mechanical or electro-mechanical system, apparatus, or device operable to move air and/or other gases in order to cool information handling resources of information handling system 102. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by an air mover control signal (e.g., a pulse-width modulation signal) communicated from air mover control system 114 of management controller 112. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include an air mover control system 114. Air mover control system 114 may include any system, device, or apparatus configured to receive one or more signals indicative of one or more temperatures within information handling system 102 (e.g., one or more signals from one or more temperature sensors 118), and based on such signals, calculate an air mover driving signal (e.g., a pulse-width modulation signal) to maintain an appropriate level of cooling, increase cooling, or decrease cooling, as appropriate, and communicate such air mover driving signal to air mover 108. In some embodiments, air mover control system 114 may include a program of instructions (e.g., software, firmware) configured to, when executed by a processor or controller integral to management controller 112, carry out the functionality of air mover control system 114. The functionality of air mover control system 114 is described in greater detail below with respect to FIG. 2.

A temperature sensor 118 may be any system, device, or apparatus (e.g., a thermometer, thermistor, etc.) configured to communicate a signal to air mover control system 114 indicative of a temperature within information handling system 102.

In addition to processor 103, memory 104, air mover 108, management controller 112, and temperature sensor 118, information handling system 102 may include one or more other information handling resources. In addition, for the sake of clarity and exposition of the present disclosure, FIG. 1 depicts only one air mover 108 and temperature sensor 118. In embodiments of the present disclosure, information handling system 102 may include any number of air movers 108 and temperature sensors 118.

Figure 2:
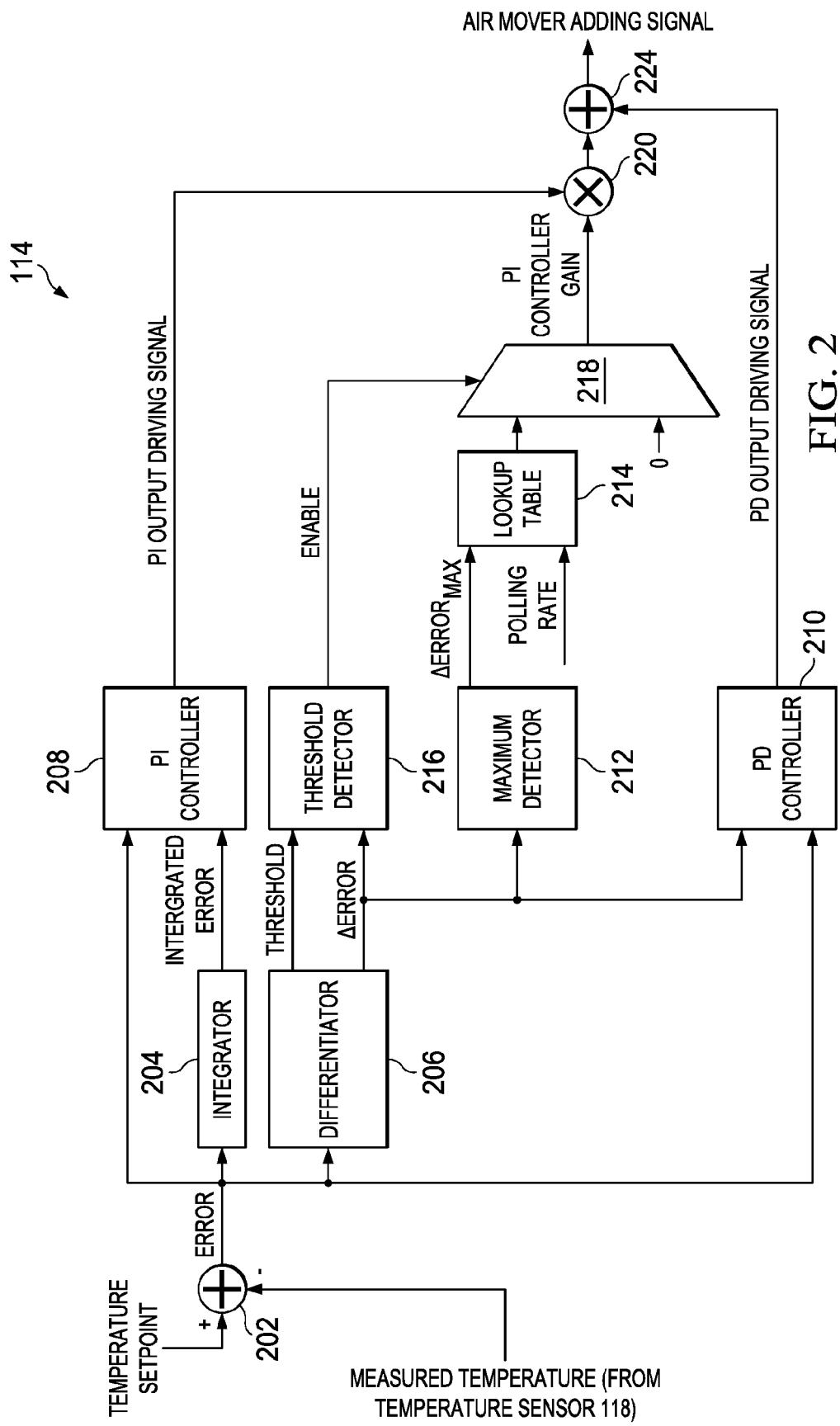
FIG. 2 illustrates a block diagram of selected components of an example air mover control system, in accordance with embodiments of the present disclosure.

FIG. 2 illustrates a block diagram of an example air mover control system 114, in accordance with embodiments of the present disclosure. As shown in FIG. 2, air mover control system 114 may include a summer 202, an integrator 204, a differentiator 206, a proportional-integral (PI) controller 208, a proportional-differential (PD) controller 210, a maximum detector 212, a lookup table 214, a threshold comparator 216, a multiplexer 218, a gain element 220, and a summer 224. Such components of air mover control system 114 may be implemented in hardware, software, firmware, or any combination thereof.

Summer 202 may calculate an error between a temperature setpoint (e.g., representing a maximum operating temperature) and a measured temperature (e.g., as indicated from a signal communicated from temperature sensor 118) to generate an error signal which may be communicated to other components of air mover control system 114.

Integrator 204 may comprise any system, device, or apparatus configured to, based on the error signal generated by summer 202, generate an integrated error signal indicative of (e.g., equal to or approximating) a time-based integral of the error signal. Integrator 204 may be implemented in any suitable manner either now and/or in the future known in the art, and such implementation is beyond the scope of this disclosure.

Differentiator 206 may comprise any system, device, or apparatus configured to, based on the error signal generated by summer 202, generate a differential error signal ΔERROR indicative of (e.g., equal to or approximating) a time derivative of the error signal. For example, in some embodiments, differential error signal ΔERROR may be equal to a difference between the respective error signal generated from the two most recent polled temperature readings from temperature sensor 118. Differentiator 206 may be implemented in any suitable manner either now and/or in the future known in the art, and such implementation is beyond the scope of this disclosure.

PI controller 208 may include any system, device, or apparatus configured to, based on the error signal generated by summer 202 and the integrated error signal generated by integrator 204, generate a PI output driving signal using proportional-integral control, as is now known and/or as may in the future be known in the art. PI controller 208 may be implemented in any suitable manner either now and/or in the future known in the art, and such implementation is beyond the scope of this disclosure. For example, in some embodiments, PI controller 208 may comprise a fixed controller. In other embodiments, PI controller 208 may comprise a non-linear and/or adaptive controller. In these and other embodiments, PI controller 208 may comprise a fuzzy logic controller.

PD controller 210 may include any system, device, or apparatus configured to, based on the error signal generated by summer 202 and the differential error signal ΔERROR generated by differentiator 206, generate a PD output driving signal using proportional-differential control, as is now known and/or as may in the future be known in the art. PD controller 210 may be implemented in any suitable manner either now and/or in the future known in the art, and such implementation is beyond the scope of this disclosure. For example, in some embodiments, PD controller 210 may comprise a fixed controller. In other embodiments, PD controller 210 may comprise a non-linear and/or adaptive controller. In these and other embodiments, PD controller 210 may comprise a fuzzy logic controller.

Maximum detector 212 may include any system, device, or apparatus configured to, based on the differential error signal ΔERROR generated by differentiator 206, detect a maximum differential error signal $\Delta ERROR_{MAX}$ occurring during any suitable period of time (e.g., during a previous number of polling cycles of temperature sensor 118, since powering on of information handling system 102, etc.). Maximum detector 212 may also store such maximum differential error signal $\Delta ERROR_{MAX}$ (e.g., in a computer-readable medium integral or otherwise accessible to maximum detector 212), and output such maximum differential error signal $\Delta ERROR_{MAX}$.

Lookup table 214 may include any suitable table, map, database, or other data structure integral or otherwise accessible to air mover control system 114 (e.g., stored in computer-readable media integral to or otherwise accessible to management controller 112) that includes a plurality of entries, wherein each entry sets forth a PI controller gain which is indexed by a polling rate of a measured temperature (e.g., measured by temperature sensor 118) and a maximum rate of change of the measured temperature between polling events of the measured temperature (e.g., as determined by maximum detector 212). Thus, based on a polling rate of a measured temperature (e.g., which may be retrieved from a thermal table stored within or accessible to management controller 112, retrieved from temperature sensor 118, or retrieved or determined in any other suitable manner), and a maximum rate of change of such measured temperature between polling events, air mover control system 114 may read from lookup table 214 a corresponding PI controller gain to be applied to a response (e.g., PI driving signal) of a PI controller 208. Turning briefly to FIG. 3, FIG. 3 illustrates an example lookup table 214 for generating PI controller gain based on a polling rate and a temperature rate of change, in accordance with embodiments of the present disclosure. As shown in FIG. 3, lookup table 214 may include a plurality of entries 302, wherein each entry 302 sets forth a PI controller gain which is indexed by one of a plurality of polling rates 304 of a measured temperature and one of a plurality of rates 306 of change of the measured temperature between polling events of the measured temperature. Thus, based on the polling rate at which temperature is sampled from temperature sensor 118 and a maximum rate of change of such measured temperature between polling events as determined by maximum detector 212, air mover control system 114 may read from lookup table 214 an entry 302 corresponding to the polling rate and the maximum rate of change, such entry 302 having a PI controller gain to be applied to the response (e.g., PI driving signal) of PI controller 208.

Turning again to FIG. 2, threshold detector 216 may include any system, device, or apparatus configured to compare the differential error signal ΔERROR generated by differentiator 206 to a predetermined threshold differential error signal value, and output an enable signal indicative of such comparison. For example, if threshold detector 216 determines that the differential error signal ΔERROR exceeds the predetermined threshold, threshold detector 216 may deassert (e.g., set to "OFF," "FALSE," logic "0," etc.) the enable signal and may assert (e.g., set to "ON," "TRUE," logic "1," etc.) the enable signal otherwise (e.g., if the differential error signal ΔERROR is less than the predetermined threshold). In some embodiments, threshold detector 216 may apply a somewhat more detailed set of rules in determining whether to assert the enable signal. For example, in some of such embodiments, threshold detector 216 may assert the enable signal only if the differential error signal ΔERROR remains below the predetermined threshold for at least a predetermined minimum number of polling cycles of temperature sensor 118.

Multiplexer 218 may include any system, device, or apparatus configured to, when the enable signal is asserted by threshold comparator 216, output a gain signal equivalent to the PI controller gain generated by lookup table 214, and otherwise (e.g., when the enable signal is deasserted by threshold comparator 216), output a gain signal of zero.

Gain element 220 may apply the gain signal output by multiplexer 218 (e.g., the PI controller gain generated by lookup table 214 if the enable signal generated by threshold comparator 216 is asserted, zero if the enable signal generated by threshold comparator 216 is deasserted) to the PI output driving signal.

Summer 224 may combine the gain modified PI output driving signal generated by gain element 220 and the PD output driving signal generated by PD controller 210 to generate an air mover driving signal (e.g., a pulse-width modulation signal) for controlling a speed of air mover 108 (e.g., speed of motor 110).

Figure 4:
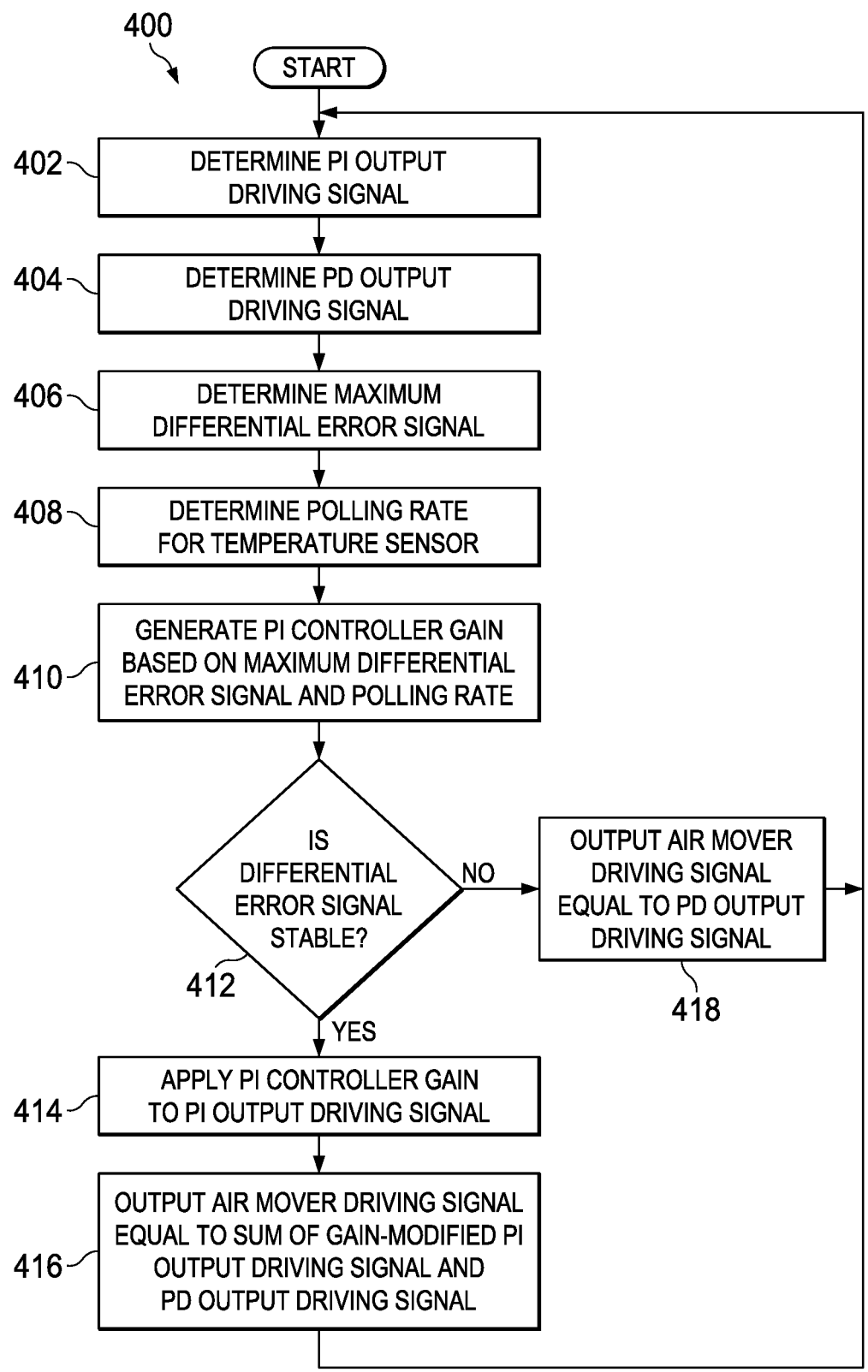
FIG. 4 illustrates a flow chart of an example method for providing stability in a response of the air mover control system of FIG. 2, in accordance with embodiments of the present disclosure.

FIG. 4 illustrates a flow chart of an example method 400 for providing stability in the response of air mover control system 114, in accordance with embodiments of the present disclosure. According to one embodiment, method 400 may begin at step 402. As noted above, teachings of the present disclosure may be implemented in a variety of configurations of information handling system 102 and/or air mover control system 114. As such, the preferred initialization point for method 400 and the order of the steps comprising method 400 may depend on the implementation chosen.

At step 402, air mover control system 114 may determine a PI output driving signal based on a temperature error signal and an integrated error signal (e.g., by PI controller 208). At step 404, air mover control system 114 may determine a PD output driving signal based on the temperature error signal and a differential error signal (e.g., by PD controller 210).

At step 406, air mover control system 114 may determine a maximum differential error signal based on previous samples of the differential error signal received over the period of time (e.g., by maximum detector 212). At step 408, air mover control system 114 may determine (e.g., receive or retrieve) a polling rate for a temperature sensor. At step 410, based on the maximum differential error signal and the polling rate, air mover control system 114 may generate a PI controller gain (e.g., by lookup table 214).

At step 412, air mover control system 114 may determine (e.g., by threshold detector 216) if the differential error signal is stable (e.g., is below a predetermined threshold value, or has been below a predetermined threshold value for a minimum period of time). If the differential error signal is stable, method 400 may proceed to step 414. Otherwise, method 400 may proceed to step 418.

At step 414, in response to the differential error signal being stable, air mover control system 114 may apply the PI controller gain to the PI output driving signal (e.g., by gain element 220). At step 416, air mover control system 114 may output an air mover driving signal (e.g., a pulse-width modulation signal) equal to the sum of the gain-modified PI output driving signal and the PD output driving signal (e.g., by summer 220). After completion of step 416, method 400 may proceed again to step 402.

At step 418, in response to the differential error signal being unstable, air mover control system 114 may output an air mover driving signal (e.g., a pulse-width modulation signal) equal to the PD output driving signal (e.g., the PI output driving signal may be muted by multiplexer 218). After completion of step 418, method 400 may proceed again to step 402.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102, air mover control system 114, or any other system operable to implement method 400. In certain embodiments, method 400 may be implemented partially or fully in software and/or firmware embodied in computer-readable media.

The systems and methods described above may provide stability (e.g., resistance to oscillation) and/or performance improvement (e.g., overshoot, and/or undershoot) in the operation of air mover control system 114. For example, the enable signal generated by threshold comparator 216 may ensure that PI controller 208 contributes to control of the air mover driving signal only when the measured temperature of temperature sensor 118 has become stable. As another example, the PI controller gain generated by lookup table 214 may scale the response of PI controller 208 based on thermal response time of temperature sensor 118 in terms of both its polling rate and change in temperature between polling cycles. Accordingly, PI controller response may be scaled down in order to prevent PI controller 208 from "overreacting" to temperature changes occurring over long polling periods.

Although the foregoing discussion contemplates application systems and methods for closed-loop control to operation of an air mover, similar methods and systems may be generalized and applied to other closed loop controls. For example, such similar methods and systems may be applied to generate a driving signal to any appropriate plant or component based on any measured process value other than a measured temperature and a setpoint value other than a setpoint temperature.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
   an integrator configured to, based on an error between a setpoint value and a measured process value, determine an integrated error indicative of a time-based integral of the error between the setpoint value and the measured process value;
   a differentiator configured to, based on the error between the setpoint value and the measured process value, determine a differential error indicative of a time-based derivative of the error between the setpoint value and the measured process value;
   a proportional-integral controller configured to, based on the integrated error and the error between the setpoint value and the measured process value, generate a proportional-integral output driving signal;
   a proportional-differential controller configured to, based on the differential error and the error between the setpoint value and the measured process value, generate a proportional-differential output driving signal;
   a comparator configured to determine whether the differential error is stable based on whether the differential error is below a threshold value; and
   control logic configured to:
      responsive to determining that the differential error is stable, generate a driving signal for controlling a plant based on the proportional-differential output driving signal and independent of the proportional-integral output driving signal; and
      responsive to determining that the differential error is not stable, generate the driving signal for controlling the plant based on the proportional-differential output driving signal and the proportional-integral output driving signal;
   wherein the plant is controlled based on the generated driving signal for driving the plant.

2. The system of claim 1, wherein the control logic is further configured to:
   determine a maximum differential error of a plurality of polling cycles of the measured process value;

determine a polling rate associated with the measured process value;
determine a proportional-integral controller gain based on the maximum differential error and the polling rate; and
apply the proportional-integral controller gain to the proportional-integral output driving signal, such that responsive to determining that the differential error is not stable, the control logic generates the driving signal for controlling the plant based on the proportional-integral output driving signal as modified by the proportional-integral controller gain and based on the proportional-differential output driving signal.

3. The system of claim 1, wherein the comparator is configured to determine that the differential error is stable responsive to the differential error being less than the threshold value for a predetermined minimum period of time.

4. The system of claim 1, wherein the setpoint value is a maximum temperature, and the measured process value is a measured temperature.

5. The system of claim 1, wherein the plant is an air mover, and the driving signal is a signal for controlling a speed of the air mover.

6. The system of claim 5, wherein the setpoint value is a maximum temperature, the measured process value is a measured temperature, and the system is configured to control the speed to maintain the measured temperature below the maximum temperature.

7. A method comprising:
based on an error between a setpoint value and a measured process value, determining an integrated error indicative of a time-based integral of the error between the setpoint value and the measured process value;
based on the error between the setpoint value and the measured process value, determining a differential error indicative of a time-based derivative of the error between the setpoint value and the measured process value;
based on the integrated error and the error between the setpoint value and the measured process value, generating a proportional-integral output driving signal;
based on the differential error and the error between the setpoint value and the measured process value, generating a proportional-differential output driving signal;
determining whether the differential error is stable based on whether the differential error is below a threshold value;
responsive to determining that the differential error is stable, generating a driving signal for controlling a plant based on the proportional-differential output driving signal and independent of the proportional-integral output driving signal;
responsive to determining that the differential error is not stable, generating the driving signal for controlling the plant based on the proportional-differential output driving signal and the proportional-integral output driving signal; and
controlling the plant based on the generated driving signal.

8. The method of claim 7, further comprising:
determining a maximum differential error of a plurality of polling cycles of the measured process value;
determining a polling rate associated with the measured process value;
determining a proportional-integral controller gain based on the maximum differential error and the polling rate; and
applying the proportional-integral controller gain to the proportional-integral output driving signal, such that responsive to determining that the differential error is not stable, the driving signal for controlling the plant is generated based on the proportional-integral output driving signal as modified by the proportional-integral controller gain and based on the proportional-differential output driving signal.

9. The method of claim 7, further comprising determining that the differential error is stable responsive to the differential error being less than the threshold value for a predetermined minimum period of time.

10. The method of claim 7, wherein the setpoint value is a maximum temperature, and the measured process value is a measured temperature.

11. The method of claim 7, wherein the plant is an air mover, and the driving signal is a signal for controlling a speed of the air mover.

12. The method of claim 11, wherein the setpoint value is a maximum temperature, the measured process value is a measured temperature, and the method includes controlling the speed to maintain the measured temperature below the maximum temperature.

13. A system comprising:
an integrator configured to, based on an error between a setpoint value and a measured process value, determine an integrated error indicative of a time-based integral of the error between the setpoint value and the measured process value;
a differentiator configured to, based on the error between the setpoint value and the measured process value, determine a differential error indicative of a time-based derivative of the error between the setpoint value and the measured process value;
a proportional-integral controller configured to, based on the integrated error and the error between the setpoint value and the measured process value, generate a proportional-integral output driving signal;
a proportional-differential controller configured to, based on the differential error and the error between the setpoint value and the measured process value, generate a proportional-differential output driving signal;
a comparator configured to determine whether the differential error is stable based on whether the differential error is below a threshold value; and
control logic configured to:
determine a maximum differential error of a plurality of polling cycles of the measured process value;
determine a polling rate associated with the measured process value;
determine a proportional-integral controller gain based on the maximum differential error and the polling rate; and
generate a driving signal for controlling a plant based on the proportional-integral output driving signal as modified by the proportional-integral controller gain and based on the proportional-differential output driving signal;
wherein the plant is controlled based on the generated driving signal for controlling the plant.

14. The system of claim 13, wherein the setpoint value is a maximum temperature and the measured process value is a measured temperature.

15. The system of claim 13, wherein the plant is an air mover, and the driving signal is a signal for controlling a speed of the air mover.

16. A method comprising:
based on an error between a setpoint value and a measured process value, determining an integrated error indicative of a time-based integral of the error between the setpoint value and the measured process value;
based on the error between the setpoint value and the measured process value, determining a differential error indicative of a time-based derivative of the error between the setpoint value and the measured process value;
based on the integrated error and the error between the setpoint value and the measured process value, generating a proportional-integral output driving signal;
based on the differential error and the error between the setpoint value and the measured process value, generating a proportional-differential output driving signal;
determining a maximum differential error of a plurality of polling cycles of the measured process value;
determining a polling rate associated with the measured process value;
determining a proportional-integral controller gain based on the maximum differential error and the polling rate;
generating a driving signal for controlling a plant based on the proportional-integral output driving signal as modified by the proportional-integral controller gain and based on the proportional-differential output driving signal; and
controlling the plant based on the generated driving signal.

17. The method of claim 16, wherein the setpoint value is a maximum temperature, and the measured process value is a measured temperature.

18. The method of claim 16, wherein the plant is an air mover, and the driving signal is a signal for controlling a speed of the air mover.

* * * * *